United States Patent Office  3,519,666
Patented July 7, 1970

3,519,666
TRIORGANOTIN DERIVATIVES OF CYCLIC COMPOUNDS
John P. Pellegrini, Jr., Pittsburgh, and Ilgvars J. Spilners, Monroeville, Pa., assignors to Gulf Research & Development Company, Pittsburgh, Pa., a corporation of Delaware
No Drawing. Filed Feb. 9, 1968, Ser. No. 704,248
Int. Cl. C07f 7/22
U.S. Cl. 260—429.7                                6 Claims

ABSTRACT OF THE DISCLOSURE

Novel triorganotin derivatives of cyclic olefins and hydrocarbyl-substituted cyclic olefins are useful as insecticides. The compounds are prepared by the addition of a triorganotin hydride to a cyclic olefin. Preferred compounds are obtained by the addition of a triaryltin hydride to cyclopentadiene, cyclohexadiene, cyclooctadiene, indene, acenaphthylene and their $C_1$ to $C_4$ alkyl-substituted derivatives. Examples include triphenyltin cyclopentene, triphenyltin methylcyclopentene, triphenyltin cyclohexene, triphenyltin cycloocten, triphenyltin indane and triphenyltin acenaphthene.

---

This invention relates to certain novel organometallic derivatives of cyclic compounds, and more particularly to triorganotin derivatives of cyclic compounds which are useful as insecticides.

The triorganotin derivatives of cyclic compounds of this invention are represented by the general formula

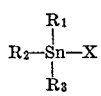

where $R_1$ is selected from the group consisting of aryl and alkaryl radicals; $R_2$ and $R_3$ are selected from the group consisting of alkyl, aryl, aralkyl, alkaryl and cycloalkyl radicals; and X is a cyclic radical selected from the group consisting of cyclopentenyl ($C_5R_6H$—), cyclohexenyl ($C_6R_8H$—), cyclooctenyl ($C_8R_{12}H$—), indanyl ($C_9R_8H$—) and acenaphthenyl ($C_{12}R_8H$—) monovalent radicals where R is selected from the group consisting of hydrogen, alkyl, aryl, aralkyl, alkaryl and cycloalkyl radicals. Illustrative of the hydrocarbyl substituents represented by R, $R_1$, $R_2$ and $R_3$ hereinabove are methyl; ethyl; propyl; isopropyl; n-butyl; sec-butyl; tertiary butyl; amyl; hexyl; heptyl n-octyl isooctyl nonyl decyl; undecyl; dodecyl; tridecyl; tetradecyl; pentadecyl; hexadecyl; heptadecyl; octadecyl; phenyl; naphthyl; benzyl; phenethyl; tolyl; xylyl; methylnaphthyl; ethylphenyl; propylphenyl; butylphenyl; amylphenyl; hexylphenyl; heptylphenyl; octylphenyl; nonylphenyl; diethylphenyl; dipropyl-, dibutyl-, diamyl-, dihexyl-, diheptyl- and dioctylphenyl; trialkylphenyl; tetraalkylphenyl; pentaalkylphenyl; cyclopentyl; cyclohexyl; cyclooctyl; alkylcycloalkyl; and the like.

The cyclopentenyl ($C_5R_6H$—), cyclohexenyl ($C_6R_8H$—)
cyclooctenyl ($C_8R_{12}H$—), indanyl ($C_9R_8H$—) and acenaphthenyl ($C_{12}R_8H$—) radicals referred to hereinabove are cyclic radicals which may be illustrated structurally as follows:

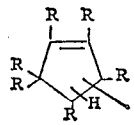

(cyclopentenyl)

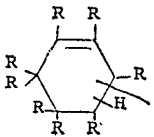

(cyclohexenyl)

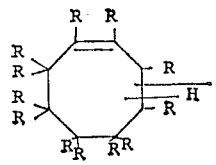

(cyclooctenyl)

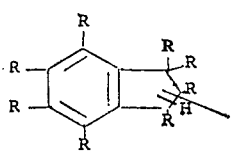

(indanyl)

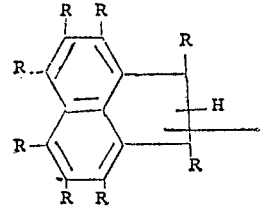

(acenaphthenyl)

The R, $R_1$, $R_2$ and $R_3$ substitutents referred to hereinabove can be like or unlike radicals within the prescribed limits for each substituent. Thus, for example, R, $R_1$, $R_2$ and $R_3$ can be the same or different aryl or alkaryl radicals. As a further illustration, $R_1$ can be an aryl or alkaryl radical while $R_2$ and $R_3$ are the same or different alkyl, alkaryl and cycloalkyl radicals and the R substituents (like or unlike) are selected from the group consisting of hydrogen, alkyl, alkaryl and cycloalkyl radicals. From the standpoint of ease in preparation and availability of starting materials, a preferred group of compounds are those wherein $R_1$, $R_2$ and $R_3$ are like aryl radicals such as, for example, phenyl radicals and the R substituents are hydrogen and/or lower alkyl radicals containing from 1 to 4 carbon atoms.

Specific examples of preferred compounds of the invention are triphenyltin cyclopentene, triphenyltin methylcyclopentene triphenyltin ethylcyclopentene, triphenyltin isopropylcyclopentene, triphenyltin n-butylcyclopentene, triphenyltin cyclohexene, triphenyltin methylcyclohexene, triphenyltin cyclooctene, triphenyltin indane and triphenyltin acenapthene. Specific examples of other compounds of the invention are triphenyltin sec-butylcyclopentene
triphenyltin tertiarybutylcyclopentene
triphenyltin amylcyclopentene
triphenyltin hexylcyclopentene
triphenyltin heptylcyclopentene
triphenyltin n-octylcyclopentene
triphenyltin isooctylcyclopentene
triphenyltin nonylcyclopentene
triphenyltin decylcyclopentene
triphenyltin undecylcyclopentene
triphenyltin dodecylcyclopentene
triphenyltin tridecylcyclopentene
triphenyltin tetradecylcyclopentene
triphenyltin pentadecylcyclopentene
triphenyltin hexadecylcyclopentene
triphenyltin heptadecylcyclopentene
triphenyltin octadecylcyclopentene
triphenyltin dimethylcyclopentene
triphenyltin trimethylcyclopentene
triphenyltin tetramethylcyclopentene
triphenyltin pentamethylcyclopentene
triphenyltin hexamethylcyclopentene
triphenyltin methylethylcyclopentene
triphenyltin methylpropylcyclopentene
triphenyltin methylbutylcyclopentene
triphenyltin dimethyldibutylcyclopentene
triphenyltin phenylcyclopentene
triphenyltin naphthylcyclopentene
triphenyltin benzylcyclopentene
triphenyltin phenethylcyclopentene
triphenyltin tolylcyclopentene
triphenyltin xylylcyclopentene
triphenyltin methylnaphthylcyclopentene
triphenyltin ethylphenylcyclopentene
triphenyltin propylphenylcyclopentene
triphenyltin butylphenylcyclopentene
triphenyltin amylphenylcyclopentene
triphenyltin hexylphenylcyclopentene
triphenyltin heptylphenylcyclopentene
triphenyltin octylphenylcyclopentene
triphenyltin nonylphenylcyclopentene
triphenyltin diethylphenylcyclopentene
triphenyltin dioctylphenylcyclopentene
triphenyltin pentamethylphenylcyclopentene
triphenyltin cyclopentylcyclopentene
triphenyltin cyclohexylcyclopentene
triphenyltin cyclooctylcyclopentene
methyldiphenyltin cyclopentene
dimethylphenyltin cyclopentene
methylethylphenyltin cyclopentene
methyldiphenyltin methylcyclopentene
triphenyltin ethylcyclohexene
triphenyltin isopropylcyclohexene
triphenyltin n-butylcyclohexene
triphenyltin isooctylcyclohexene
triphenyltin dimethylcyclohexene
triphenyltin tetramethylcyclohexene
triphenyltin octamethylcyclohexene
triphenyltin methethylcyclohexene
triphenyltin isopropylmethylcyclohexene
triphenyltin dimethyldibutylcyclohexene
triphenyltin phenylcyclohexene
triphenyltin naphthylcyclohexene
triphenyltin benzylcyclohexene
triphenyltin phenethylcyclohexene
triphenyltin tolylcyclohexene
triphenyltin xylylcyclohexene
triphenyltin cyclopentylcyclohexene
triphenyltin cyclohexylcyclohexene
triphenyltin cyclooctylcyclohexene
methyldiphenyltin cyclohexene
dimethylphenyltin cyclohexene
methylethylphenyltin cyclohexene
methyldiphenyltin methylcyclohexene
triphenyltin methylcyclooctene
triphenyltin ethylcyclooctene
triphenyltin isopropylcyclooctene
triphenyltin n-butylcyclooctene
triphenyltin isooctylcyclooctene
triphenyltin dimethylcyclooctene
triphenyltin tetramethylcyclooctene
triphenyltin octamethylcyclooctene
triphenyltin dodecamethylcyclooctene
triphenyltin methylethylcyclooctene
triphenyltin isopropylmethylcyclooctene
triphenyltin dimethyldibutylcyclooctene
triphenyltin phenylcyclooctene
triphenyltin naphthylcyclooctene
triphenyltin benzylcyclooctene
triphenyltin phenethylcyclooctene
triphenyltin tolylcyclooctene
triphenyltin xylylcyclooctene
triphenyltin cyclophenylcyclooctene
triphenyltin cyclohexylcyclooctene
triphenyltin cyclooctylcyclooctene
methyldiphenyltin cyclooctene
dimethylphenyltin cyclooctene
methylethylphenyltin cyclooctene
methyldiphenyltin methylcyclooctene
triphenyltin methylindane
triphenyltin ethylindane
triphenyltin isopropylindane
triphenyltin n-butylindane
triphenyltin isooctylindane
triphenyltin dimethylindane
triphenyltin tetramethylindane
triphenyltin octamethylindane
triphenyltin methylethylindane
triphenyltin dimethyldibutylindane
triphenyltin phenylindane
triphenyltin napththylindane
triphenyltin benzylindane
triphenyltin phenethylindane
triphenyltin tolylindane
triphenyltin xylylindane
triphenyltin cyclopentylindane
triphenyltin cyclohexylindane
triphenyltin cyclooctylindane
methyldiphenyltin indane
dimethylphenyltin indane
methylethylphenyltin indane
methyldiphenyltin methylindane
triphenyltin methylacenaphthene
triphenyltin ethylacenaphthene
triphenyltin isopropylacenaphthene
triphenyltin n-butylacenaphthene
triphenyltin isooctylacenaphthene
triphenyltin dimethylacenaphthene
triphenyltin tetramethylacenaphthene
triphneyltin octamethylacenaphthene
triphenyltin methylethylacenaphthene
triphenyltin dimethyldibutylacenaphthene
triphenyltin phenylacenaphthene triphenyltin naphthylacenaphthene
triphenyltin benzylacenaphthene
triphenyltin phenethylacenaphthene
triphenyltin tolylacenaphthene
triphenyltin xylylacenaphthene
triphenyltin cyclopentylacenaphthene
triphenyltin cyclohexylacenaphthene
triphenyltin cyclooctylacenaphthene
methyldiphenyltin acenaphthene
dimethylphenyltin acenaphthene
methylethylphenyltin acenaphthene
methyldiphenyltin methylacenaphthene The novel organotin derivatives of the cyclic compounds of this invention are, in general, liquid or solid compounds, the solids meling at low or moderate temperatures. They are stable at ordinary temperatures and can be readily prepared and stored without special precautions for future use.

The compounds of the invention can be prepared in various ways. The compounds, for example, can be prepared by the addition of a triorganotin hydride to a cyclic olefin. Triphenyltin cyclopentene, for example, can be prepared by the addition of triphenyltin hydride to cyclopentadiene. Triphenyltin cyclohexene can be prepared by the addition of triphenyltin hydride to cyclohexadiene. Triphenyltin cyclooctene can be prepared by the addition of triphenyltin hydride to cyclooctadiene. Triphenyltin indane and triphenyltin acenaphthene can be prepared by the addition of triphenyltin hydride to indene and acenaphthylene, respectively. The triphenyltin derivatives of the hydrocarbyl-substituted cyclic olefins can be similarly prepared. Triphenyltin methylcyclopentene, for example, can be prepared by the addition of triphenyltin hydride to methylcyclopentadiene. Other triorganotin derivatives, including trialkaryltin, alkyldiaryltin, aralkyldiaryltin, alkaryldiaryltin, cycloalkyldiaryltin, aryldialkyltin, aryldiaralkyltin, aryldialkaryltin and trialkaryltin derivatives of cyclic olefins and hydrocarbyl-substituted cyclic olefins and hydrocarbyl substituted cyclic olefins can be similarly prepared. The addition reaction is preferably carried out with the reactants in a molten state or dissolved in an inert solvent under nitrogen at a temperature within the range of about 40° to about 100° C., generally between about 45° and 90° C. The reaction may be promoted also by ultraviolet light and by free radical initiators, such as azobis(isobutyronitrile). Completion of the reaction is generally favored by the presence of excess olefinic charge stock. The compounds of the invention can be recovered and purified according to known techniques including solvent extraction, filtration, recrystallization, or the like, dependent upon the nature of the particular compound in question.

In preparing the triorganotin derivatives of the cyclic compounds of the present invention, the initial reactants comprising the triorganotin hydrides and the cyclic olefins either are available commercially or can be readily prepared by known procedures so that neither of these reactants nor their method of preparation constitutes any portion of the invention. The triorganotin hydride, for example, can be prepared by reacting the corresponding triorganotin chloride with lithium aluminum hydride.

Examples of the triorganotin hydrides which are used in the present invention are:

Triphenyltin hydride, trinaphthyltin hydride, tritolyltin hydride, methyldiphenyltin hydride, ethyldiphenyltin hydride, propyldiphenyltin hydride, butyldiphenyltin hydride, amyldiphenyltin hydride, hexyldiphenyltin hydride, heptyldiphenyltin hydride, octyldiphenyltin hydride, nonyldiphenyltin hydride, decyldiphenyltin hydride, dodecyldiphenyltin hydride, tetradecyldiphenyltin hydride, octadecyldiphenyltin hydride, benzyldiphenyltin hydride, tolyldiphenyltin hydride, cyclopentyldiphenyltin hydride, phenyldimethyltin hydride, phenyldiethyltin hydride, phenyldiisopropyltin hydride, phenyldibutyltin hydride, phenyldiisooctyltin hydride, phenyldibenzyltin hydride, phenylditolyltin hydride, phenyldicyclopentyltin hydride, methylditolyltin hydride, ethylditolyltin hydride, propylditolyltin hydride, butylditolyltin hydride, octylditolyltin hydride, benzylditolyltin hydride, cyclopentylditolyltin hydride, tolyldimethyltin hydride, tolyldiethyltin hydride, tolyldiisopropyltin hydride, tolyldibutyltin hydride, tolyldiisooctyltin hydride, tolyldibenzyltin hydride, tolyldicyclopentyltin hydride, methylethylphenyltin hydride, methylethyltolyltin hydride, methylphenyltolyltin hydride, methylbenzylphenyltin hydride, methylcyclopentylphenyltin hydride.

Specific examples of some of the cyclic olefin starting materials to which the triorganotin hydrides are aded to produce compounds of the invention are:

Cyclopentadiene, methylcyclopentadiene, ethylcyclopentadiene, n-propylcyclopentadiene, isopropylcyclopentadiene, n-butylcyclopentadiene, sec-butylcyclopentadiene, tertiary-butylcyclopentadiene, amylcyclopentadiene, hexylcyclopentadiene, heptylcyclopentadiene, n-octylcyclopentadiene, isooctylcyclopentadiene, nonylcyclopentadiene, decylcyclopentadiene, undecylcyclopentadiene, dodecylcyclopentadiene, tridecylcyclopentadiene, tetradecylcyclopentadiene, pentadecylcyclopentadiene, hexadecylcyclopentadiene, heptadecylcyclopentadiene, octadecylcyclopentadiene, dimethylcyclopentadiene, trimethylcyclopentadiene, tetramethylcyclopentadiene, pentamethylcyclopentadiene, hexamethylcyclopentadiene, methylethylcyclopentadiene, methylpropylcyclopentadiene, methylbutylcyclopentadiene, dimethyldibutylcyclopentadiene, phenylcyclopentadiene, naphthylcyclopentadiene, benzylcyclopentadiene, phenethylcyclopentadiene, tolylcyclopentadiene, xylycyclopentadiene, cyclopentylcyclopentadiene, cyclohexylcyclopentadiene, cyclooctylcyclopentadiene, cyclohexadiene.

Methylcyclohexadiene, ethylcyclohexadiene, isopropylcyclohexadiene, n-butylcyclohexadiene, isooctylcyclohexadiene, dimethylcyclohexadiene, tetramethylcyclohexadiene, octamethylcyclohexadiene, methylethylcyclohexadiene, isopropylmethylcyclohexadiene, dimethyldibutylcyclohexadiene, phenylcyclohexadiene, naphthylcyclohexadiene, benzylcyclohexadiene, phenethylcyclohexadiene, tolylcyclohexadiene, xylylcyclohexadiene, cyclopentylcyclohexadiene, cyclohexylcyclohexadiene, cyclooctylcyclohexadiene, cyclooctadiene, methylcyclooctadiene, ethylcyclooctadiene, isopropylcyclooctadiene, n-butylcyclooctadiene, isooctylcyclooctadiene, dimethylcyclooctadiene, tetramethylcyclooctadiene, octamethylcyclooctadiene, dodecamethylcyclooctadiene, methylethylcyclooctadiene, isopropylmethylcyclooctadiene, dimethyldibutylcyclooctadiene, phenylcyclooctadiene, naphthylcyclooctadiene, benzylcyclooctadiene, phenethylcyclooctadiene, tolylcyclooctadiene, xylylcyclooctadiene, cyclopentylcyclooctadiene, cyclohexylcyclooctadiene, cyclooctylcyclooctadiene, indene, methylidene, ethylindene, isopropylidene, n-butylindene, isooctylindene, dimethylindene, tetramethylindene, octamethylindene, methylethylindene, dimethyldibutylindene, phenylindene, naphthylindene, benzylindene, phenethylindene, tolylindene, xylylindene, cyclopentylindene, cyclohexylindene, cyclooctylindene, acenaphthylene, methylacenaphthylene, ethylacenaphthylene, isopropylacenaphthylene, n-butylacenaphthylene, isooctylacenaphthylene, dimethylacenaphthylene, tetramethylacenaphthylene, octamethylacenaphthylene, methylethylacenaphthylene, dimethyldibutylacenaphthylene, phenylacenaphthylene, naphthylacenaphthylene, benzylacenaphthylene, phenethylacenaphthylene, tolylacenaphthylene, xylylacenaphthylene, cyclopentylacenaphthylene, cyclohexylacenaphthylene, cyclooctylacenaphthylene.

The following examples illustrate specific procedures by which compounds of the invention can be prepared.

EXAMPLE I

Triphenyltin cyclopenten

Triphenyltin hydride is prepared by adding 50 grams (0.13 mole) of triphenyltin chloride dissolved in 500 ml. of anhydrous ether to 5 grams (0.13 mole) of lithium aluminum hydride in 250 ml. of anhydrous ether. The mixture is stirred and heated at the reflux temperature of ether (under nitrogen) for three hours. Then, 0.15 gram of hydroquinone, 25 ml. of water and 25 ml. of a 20% aqueous solution of potassium sodium tartrate are added. The reaction mass is then filtered into a separatory funnel wherein an ether layer and an aqueous layer are formed. The aqueous layer is further extracted with ether. The ether solutions are combined, dried over a suitable drier such as "Drierite," filtered and evaporated under nitrogen at room temperature. The residue obtained after removal of the ether consists of 35 grams (0.1 mole) of a colorless oil, which upon infrared examination has a band at 1860 cm.$^{-1}$ characteristic of Sn-H of triphenyltin hydride. The triphenyltin hydride thus obtained can be used immediately without further purification or it can be stored, preferably at a temperature below about 0° C. for subsequent use.

14 grams (0.04 mole) of triphenyltin hydride, obtained as described above, is dissolved in 25 ml. of benzene. This solution is added to 3.3 grams (0.05 mole) of cyclopentadiene in 25 ml. of benzene. The mixture thus formed is stirred under nitrogen for three hours while the temperature is increased from 50° to 90° C. At the end of the three hour period, the benzene is almost completely evaporated. An infrared spectrum of the residue at this point shows a band at 1860 cm.$^{-1}$ indicating the presence of some unreacted hydride. To complete the reaction, 1.9 grams of additional cyclopentadiene is introduced and heating is continued for five hours at 45° to 65° C. The mixture is then cooled under a stream of nitrogen. The residue is extracted with hot 95% ethanol. On cooling, 12.0 grams of white crystals having a melting point of 82° C. are obtained. Elemental, infrared and mass spectrometric analysis of the white crystals show that the crystalline product comprises 3-triphenyltin cyclopentene (73% yield). A carbon, hydrogen and tin determination of the product shows a favorable comparison to the theoretical analysis for 3-triphenyltin cyclopentene as follows:

Ultimate analysis.—Calculated for 3-triphenyltin cyclopentene $C_{23}H_{22}Sn$ (percent): C, 66.35; H, 5.29; Sn, 28.36; M.W., 416.7. Found for product (percent): C, 66.55; H, 5.27; Sn, 27.40; M.W., 415

The NMR spectrum of the compound has a 15 phenyl H band at $\tau$2.83, 2 ethylene H band at $\tau$4.03 and 4.5, 1 methine H band at $\tau$7.05, and 4 methylene H band at $\tau$7.75. The infrared spectrum (Nujol, Fluorolube) has bands at 3100, 2900–3000, 1480 (s.), 1425 (s.), 1300, 1250, 1225, 1155, 1090, 1070 (s.), 1020 (s.), 995 (s.), 900 (s.), 820, 720–730 (v.s.) and 698 (v.s.) cm.$^{-1}$ where (s.) is strong and (v.s.) is very strong.

EXAMPLE II

(Triphenyltin methylcyclopentene)

30.5 grams (0.087 mole) of triphenyltin hydride, obtained as described in Example I, and 8 grams (0.1 mole) of freshly distilled methylcyclopentadiene are dissolved in 25 ml. of dry benzene. About 0.5 gram of azobis(isobutyronitrile) is added to the mixture which is then stirred and heated at 65°–70° C. under nitrogen for 18 hours. Then the mixture is cooled, diluted with about 200 ml. of n-hexane and filtered. The filtrate is evaporated and the residue is dissolved in hot absolute ethanol. On cooling, 17 grams (0.0394 mole) of white crystals of triphenyltin methylcyclopentene, having a melting point of 75°–76° C. are collected (45% yield). A carbon, hydrogen and tin determination of the product shows a favorable comparison to the theoretical analysis for triphenyltin methylcyclopentene as follows:

| Ultimate Analysis | Found for Product | Calculated for Triphenyltin methylcyclopentene $C_{24}H_{24}Sn$ |
| --- | --- | --- |
| Carbon, percent | 66.55 | 66.89 |
| Hydrogen, percent | 5.38 | 5.57 |
| Tin, percent | 26.81 | 27.54 |
| Molecular weight | 430 | 431 |

The NMR spectrum of the compound has a 15 phenyl H band centered at $\tau$2.6, 1 ethylene H band at $\tau$4.6, 5 saturated hydrocarbon H band at $\tau$7.4 and 3 methyl H band at $\tau$8.35. The infrared spectrum Nujol, Fluorolube) has bands at 3100, 2900–3000, 1480, 1425, 1375, 1350, 1300, 1255, 1150–1180, 1075 (s.), 1025 (s.), 995 (s.), 972 (s.), 910, 855 795 (s.), 725 (v.s.) and 698 (v.s.) cm.$^{-1}$ where (s.) is strong and (v.s.) is very strong.

EXAMPLE III

Triphenyltin indane 16 grams (0.116 mole) of indene is added to 5 grams (0.0142 mole) of triphenyltin hydride, obtained as described in Example I, dissolved in 200 ml. of benzene. The solution is refluxed under nitrogen while allowing benzene gradually to escape. The mixture of indene and triphenyltin hydride is heated at 70° to 80° C. for about 15 hours. A white solid forms and is dissolved in benzene. The solution is filtered after which a white crystalline solid is precipitated from the benzene filtrate by adding petroleum ether. The white crystals which are precipitated, 5.5 grams, are collected by filtration and dried in a vacuum desiccator. The crystals thus obtained melt at 164° C. Elemental, infrared and mass spectrometric analysis of the white crystals show that the crystalline product comprises triphenyltin indane (10% yield). A carbon, hydrogen and tin determination of the product shows a favorable comparison to the theoretical analysis for triphenyltin indane as follows:

| Ultimate Analysis | Found for Product | Calculated for Triphenyltin indane $C_{27}H_{24}Sn$ |
| --- | --- | --- |
| Carbon, percent | 69.72 | 69.42 |
| Hydrogen, percent | 5.03 | 5.14 |
| Tin, percent | 24.88 | 25.43 |
| Molecular weight | 455 | 466.7 |

The NMR spectrum of the compound has peaks at $\tau$2.55 (15 phenyl hydrogens), $\tau$2.81 (4 indanyl phenyl hydrogens), $\tau$6.6 and 6.7 (4 indanyl methylene hydrogens) and a quintet at $\tau$7.0–7.6 (indanyl methine hydrogen). This shows that the product is 2-triphenyltin indane. Two peaks at $\tau$6.1 and 6.3 suggest the presence of a small amount (10%) of 3-triphenyltin indane. The infrared spectrum (Nujol, Fluorolube) has bands at 3080 (w.), 2900–2950 (w.), 1450, 1425, 1300, 1250, 1210, 1125, 1070, 1060, 1020, 995, 980 (w.), 930 (w.), 915 (w.), 910 (w.), 750, 730 (s.) and 696 (s.) cm.$^{-1}$ where (w.) is weak and (s.) is strong.

EXAMPLE IV

Triphenyltin acenaphthene)

5 grams (0.0142 mole) of triphenyltin hydride, obtained as described in Example I, and 2 grams (0.0142 mole) of acenaphthylene are dissolved in 50 ml. of dry benzene and heated at 65°–70° C. under nitrogen with stirring for 20 hours. The reaction mixture is cooled, dissolved in 100 ml. of benzene and filtered. The mixture is cooled and diluted with 200 ml. of n-hexane whereupon 5 grams of a white crystalline material, triphenyltin acenaphthene, having a melting point of 124° C. are obtained (70% yield). A carbon, hydrogen and tin determination of the product shows a favorable comparison to the theoretical analysis for triphenyltin acenaphthene as follows:

| Ultimate Analysis | Found for Product | Calculated for Triphenyltin acenaphthene $C_{30}H_{24}Sn$ |
|---|---|---|
| Carbon, percent | 71.26 | 71.63 |
| Hydrogen, percent | 4.61 | 4.77 |
| Tin, percent | 23.65 | 23.60 |

The NMR spectrum of the compound has a 21 phenyl H band centered at $\tau 2.8$ and a 3 H (saturated hydrocarbon) band centered at $\tau 6.25$. The infrared spectrum (Nujol, Fluorolube) has bands at 3100, 2900–3000, 1590–1610, 1450–1500, 1250, 1190, 1075 (s.), 1020, 1010, 1000 (s.), 955, 852, 840, 812 (v.s.), 785 (v.s.), 755 (s.), 725–730 (v.s.), and 695° (v.s.) where (s.) is strong and (v.s.) is very strong.

In order to illustrate the insecticidal properties of compounds of the invention, use has been made of a Microdrop Test Method, which is an advanced screening technique used in evaluating the insecticidal properties of compounds. In accordance with the microdrop procedure, the flies which are to be used in the test are first immobilized by placing them for 30 to 40 minutes in a refrigerator at 28° F. The flies are then counted into groups of 25 without regard to sex. The flies are then separately placed in groups of 25 in disposable cylindrical cages comprising waxed cardboard containers with a wire screen top. The cardboard containers are about ½ inch in depth and 3½ inches in diameter. Four or five cages each of which contains 25 flies are placed in a vessel into which is introduced a constant stream of carbon dioxide. After being exposed to carbon dioxide for about eight to ten minutes, the flies are again immobilized. The flies in an immobilized state are removed from the cages and each fly is separately contacted with an acetone or dimethylformamide solution of the test compound. The solution of the test compound is placed in a ¼ cc. tuberculin syringe which is inserted in a microdrop applicator. The microdrop applicator is equipped with a hypodermic needle capable of delivering droplets consisting of one microliter of solution. The droplet is placed on the thorax or abdomen of the anesthetized fly. After all the flies in one container have been treated, the screen lid is replaced on the container which is then placed in a storage rack for twenty-four hours at 82±2° F. At the same time, control evaluations are made with untreated flies and with flies treated only with the solvent. During the twenty-four hour period, the flies are fed by means of a wad of cotton soaked in a 5 percent sugar solution which has been squeezed partially dry; the wad of cotton is placed on the screen lid of the container. After the twenty-four hour period, the flies are examined and the percent of dead flies is recorded.

When 0.5 gram of 3-triphenyltin cyclopentene of Example I was dissolved in 25 ml. of acetone and then applied to flies in accordance with the Microdrop Test described hereinabove, the kill of flies in 24 hours was 99%. When 0.5 gram of triphenyltin methylcyclopentene of Example II was dissolved in 25 ml. of acetone and similarly tested, the kill of flies in 24 hours was 96%.

While the above tests were made with acetone solutions, other solvents commonly employed in insecticide compositions can be employed if desired and when necessary to obtain complete solution. These solvents include light petroleum fractions such as deodorized naphthas and kerosenes; lubricating oils of light viscosity; aromatic hydrocarbons such as a benzene; toluene and alkyl naphthalenes such as α-methyl naphthalene; alcohols such as ethanol, propanol and butanol; and ketones including not only acetone but also methyl ethyl ketone.

While the compounds of the instant invention have insecticidal properties of their own, the compounds can be used in conjunction with other insecticide toxicants including pyrethrins and the like.

The compounds disclosed herein when used as insecticides are generally used in amounts of about 2,000 milligrams per 100 cubic centimeters of solvent. When used in conjunction with pyrethrins, the compounds are used in amounts in the order of about 20 to about 2,000 milligrams per 100 cubic centimeters of solvent. The most useful proportion of pyrethrins are between about 20 and about 2,000 milligrams per 100 cubic centimeters of solvent.

While our invention has been described with reference to various specific examples and embodiments, it will be understood that the invention is not limited to such examples and embodiments and may be variously practiced within the scope of the claims hereinafter made.

We claim:

1. A triorganotin derivative of a cyclic compound represented by the general formula

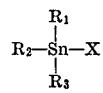

where $R_1$ is selected from the group consisting of aryl and alkaryl radicals; $R_2$ and $R_3$ are selected from the group consisting of alkyl, aryl, aralkyl, alkaryl and cycloalkyl radicals; and X is a cyclic radical selected from the group consisting of cyclopentenyl ($C_5R_6H-$), cyclohexenyl ($C_6R_8H-$), cyclooctenyl ($C_8R_{12}H-$), indanyl $$(C_9R_8H-)$$

and acenaphthenyl ($C_{12}R_8H-$) monovalent radicals where R is selected from the group consisting of hydrogen, alkyl, aryl, aralkyl, alkaryl and cycloalkyl radicals.

2. A triorganotin derivative of a cyclic compound represented by the general formula

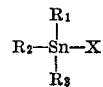

where $R_1$, $R_2$ and $R_3$ are aryl radicals and X is a cyclic radical selected from the group consisting of cyclopentenyl ($C_5R_6H-$), cyclohexenyl ($C_6R_8H-$), cyclooctenyl ($C_8R_{12}H-$), indandyl ($C_9R_8H-$) and acenaphthenyl ($C_{12}R_8H-$) monovalent radicals where R is selected from the group consisting of hydrogen and alkyl radicals containing from 1 to 4 carbon atoms.

3. Tripenyltin cyclopentene.
4. Triphenyltin methylcyclopentene.
5. Thiphenyltin indane.
6. Triphenyltin acenaphthene.

References Cited

FOREIGN PATENTS 1,198,362 8/1965 Germany.
1,212,531 3/1966 Germany.
1,214,237 4/1966 Germany.

OTHER REFERENCES

Ingham et al., Chem. Reviews, vol. 60, #5, (1960), pp. 470–1, 260–429.7.

TOBIAS E. LEVOW, Primary Examiner

W. F. W. BELLAMY, Assistant Examiner

U.S. Cl. X.R.

424—288

PO-1050
(5/69)

UNITED STATES PATENT OFFICE
CERTIFICATE OF CORRECTION

Patent No. 3,519,666          Dated July 7, 1970

Inventor(s) John P. Pellegrini, Jr. and Ilgvars J. Spilners

It is certified that error appears in the above-identified patent and that said Letters Patent are hereby corrected as shown below:

Column 1, line 23, "cyloocten," should read -- cyclooctene, --.

Column 4, line 1, "methethylcyclohexene" should read
       -- methylethylcyclohexene --, line 35, "cyclophenylcyclooctene" should read
         -- cyclopentylcyclooctene --.

Column 5, line 16, "meling" should read -- melting --, line 41, delete "and hydrocarbyl substituted cyclic olefins".

Column 6, line 72, "cyloocetyl-" should read -- cyclooctyl- --.

Column 7, line 2, "cyclopenten" should read -- cyclopentene --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents